United States Patent
Flint

[15] 3,649,077
[45] Mar. 14, 1972

[54] SEAT ASSEMBLY

[72] Inventor: Hyland C. Flint, 3551 Walnut Lake Road, Orchard Lake, Mich. 48033

[22] Filed: Apr. 6, 1970

[21] Appl. No.: 25,902

Related U.S. Application Data

[63] Continuation-in-part of Ser. No. 12,600, Feb. 19, 1970, abandoned.

[52] U.S. Cl..................................297/456, 5/246, 267/110
[51] Int. Cl..........................................................A47c 7/02
[58] Field of Search...................................267/85–87, 106, 267/108–111; 297/456; 5/246

[56] References Cited

UNITED STATES PATENTS

| | | | |
|---|---|---|---|
| Re. 21,263 | 11/1939 | Kaden.....................................267/110 |
| 210,989 | 12/1878 | Bunnell..................................5/246 X |
| 2,414,978 | 1/1947 | Richardson................................5/237 |

*Primary Examiner*—James C. Mitchell
*Attorney*—McGlynn, Reising, Milton & Ethington

[57] ABSTRACT

A peripherally resilient spring seat assembly having a load responsive spring quality and including a unitary or composite border structure of U-shaped end segments and parallel side segments. The end segments are joined to a support base at the bight portions thereof. Sinuous wire springs are connected between the side segments. The border structure may be used in a single occupant or multiple occupant seat design either as the seat, backrest, or both.

45 Claims, 17 Drawing Figures

Patented March 14, 1972

INVENTOR.
Hyland C. Flint

BY
Barnard, McGlynn & Reising
ATTORNEYS

Patented March 14, 1972

INVENTOR.
Hyland C. Flint

BY

Barnard, McGlynn & Reising
ATTORNEYS

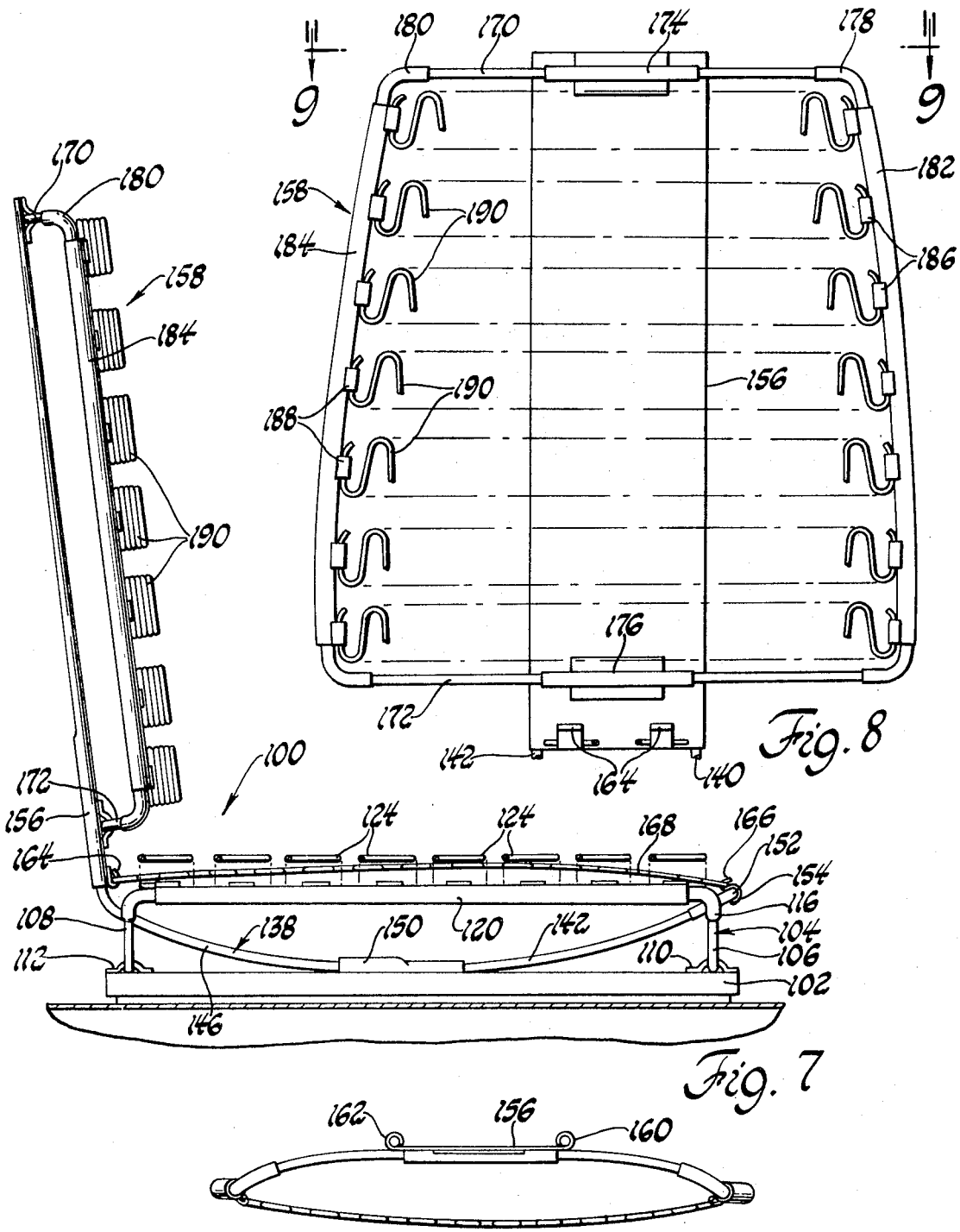

Patented March 14, 1972

INVENTOR.
Hyland C. Flint
BY
Barnard, McGlynn & Reising
ATTORNEYS

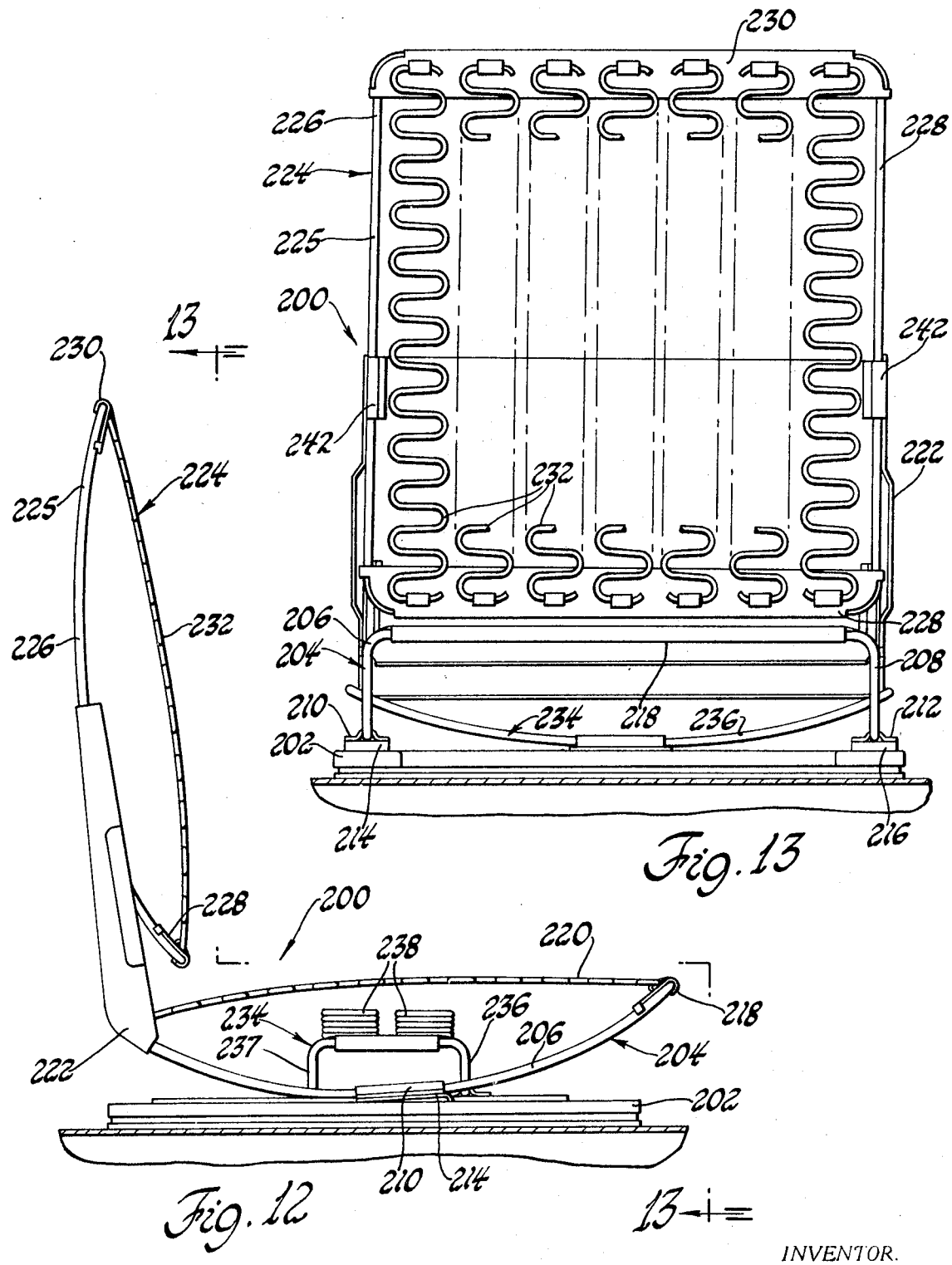

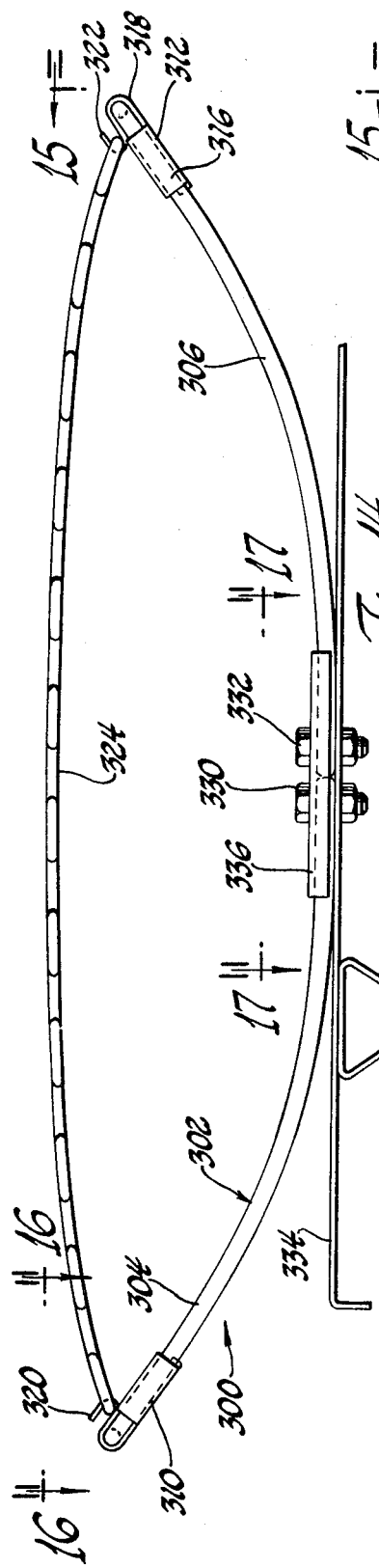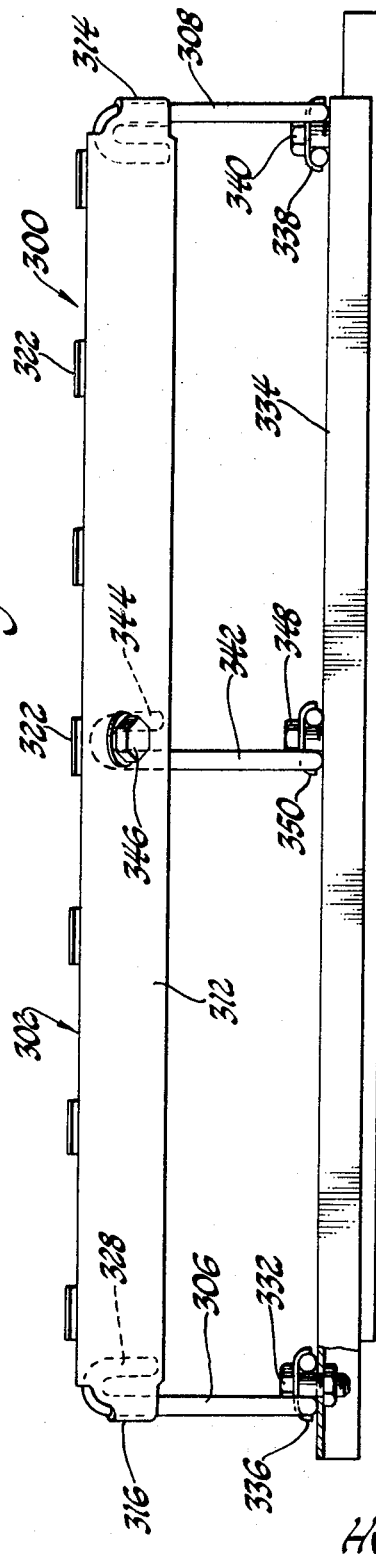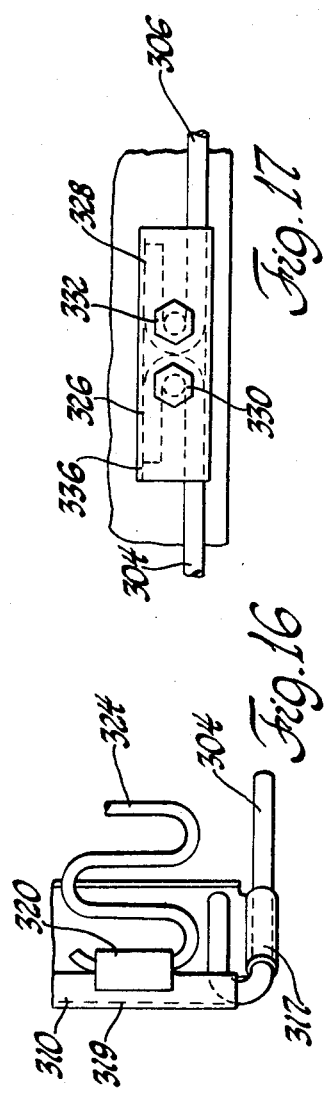

3,649,077

SEAT ASSEMBLY

This is a continuation-in-part of U.S. Ser. No. 12,600 and now abandoned, filed on or about Feb. 19, 1970 in the name of Hyland C. Flint and entitled "Seat Assembly."

This invention relates to seat assemblies and particularly to a seat assembly having a composite arrangement of resilient elements to provide load-responsive support qualities.

Load-responsive support qualities are highly desirable in seat assemblies where the same seat design must accommodate a variety of occupants of different size and weight. A seat without such qualities is necessarily designed as a matter of compromise and, thus, is often too soft for a heavy occupant and too hard for a light occupant.

The seat assembly of the present invention provides load-responsive support qualities such that comfortable resilience may be experienced by both heavy and light occupants. In general, this is accomplished by a seat assembly having, as a first resilient means, a border structure which is disposed on a base and which has resilient end segments displaceably supporting side segments. The side segments in turn support second resilient means such as strip springs extending between the side segments to define a seat support area. Accordingly, a seat assembly of full peripheral resilience is provided.

Moreover, by preforming the end segments to reversely and, in some cases, symmetrically bend away from the base about the support points, the load responsive qualities are provided since the resilient means defining the seat support area and the end segments are deflected together under load. The deflection of the end segments relative to the base causes stretching of the resilient means thereby to provide the composite spring effect.

In a specific form of the invention, the end segments are substantially arcuately bent such that deflection thereof relative to the base causes increased lineal contact between the end segments and the base. This increase in lineal contact away from the point of securement effectively shortens the lever arm through which the load acts on the end segments and, in effect, changes the spring rate of the resilient end segments. This changing spring rate effect is, of course, in addition to the stretching of the second resilient means disposed between the side elements, which stretching occurs upon deflection of the end segments. Therefore, the seat assembly offers increasing support to increasingly heavier loads.

In the preferred form, the resilient means defining the seat support area comprises sinuous strip wire springs which are pre-arched in accordance with the method disclosed in the Kaden U.S. Pat. No. Re. 21,263, issued Nov. 14, 1939. Such springs thus form a convex seat surface which flattens under load and controls the arcuate deflection of the side segments to which the springs are attached.

It is to be understood that the terms "end" and "side" used herein to designate different portion of the seat border structure have no set significance with respect to defining the orientation of the structure within an actual seat. As will be made clearer in the following description of illustrative embodiments of the invention, the border structure may be oriented within a seat assembly with the end segments running either laterally or longitudinally. Accordingly, the seat assembly of the present invention may be employed advantageously in a single-seat application such or in an extended seat application such as one generally refers to as a "bench" seat, the benefits of the invention being fully present in either application.

In accordance with the invention, the border structure may be fabricated as a unitary element of bent spring wire stock, for example, or it may be assembled from a number of standardized pieces. In one embodiment illustrative of the latter approach, each of the end segments may be fabricated from two identical arcuate pieces which can be secured such as by bolting to a base in reversely symmetrical orientation. The side segments, which may or may not be integrated with retaining means for the springs to be disposed therebetween, are adapted to receive the outward ends of the arcuate pieces to complete the assembly. In another embodiment illustrative of the separate-piece approach, the side segments may be tubular in nature to receive the ends of the end segments.

In accordance with another feature of the invention, the basic combination of the border structure and second resilient means may be employed as a basic building block of a seat assembly; that is, it may form the seat or backrest portion of the assembly, or both. Moreover, two such structural combinations, one disposed within the other, may used to provide a seat with exceptional durability and longevity. It is thus to be understood that the term "base" as used herein may refer to a substantially horizontal or vertical support structure for the border structure of a seat or backrest, as the case may be, and that moreover the "base" of one such structure may be part of another such structure or, at least, supported by such other structure.

In accordance with another feature of the invention, a given border structure may be made a symmetrical or asymmetrical load-deflection characteristic in several ways. In one way, the physical size of the end segments may be varied on opposite sides of the securement point. In another way, the radius of curvature of the end segments may be varied on opposite sides of the securement point.

The invention as well as the various features and advantages thereof may be best understood by reference to the following specification which describes two illustrative embodiments thereof. This specification is to be taken with the accompanying drawings of which:

FIG. 7 is a side view of another single occupant seat assembly employing the invention;

FIG. 8 is a plan view of the backrest portion of the seat assembly of FIG. 7;

FIG. 9 is a top view of the backrest of FIG. 8;

FIG. 12 is a side view of another single occupant seat assembly employing the invention;

FIG. 13 is a front view of the seat assembly of FIG. 12;

FIG. 14 is a front view of still another embodiment of the invention;

FIG. 15 is a side view of the embodiment of FIG. 14;

FIG. 16 is an enlarged view of a detail of the embodiment of FIG. 14; and

FIG. 17 is an enlarged view of another detail of the embodiment of FIG. 14.

Figure 1:
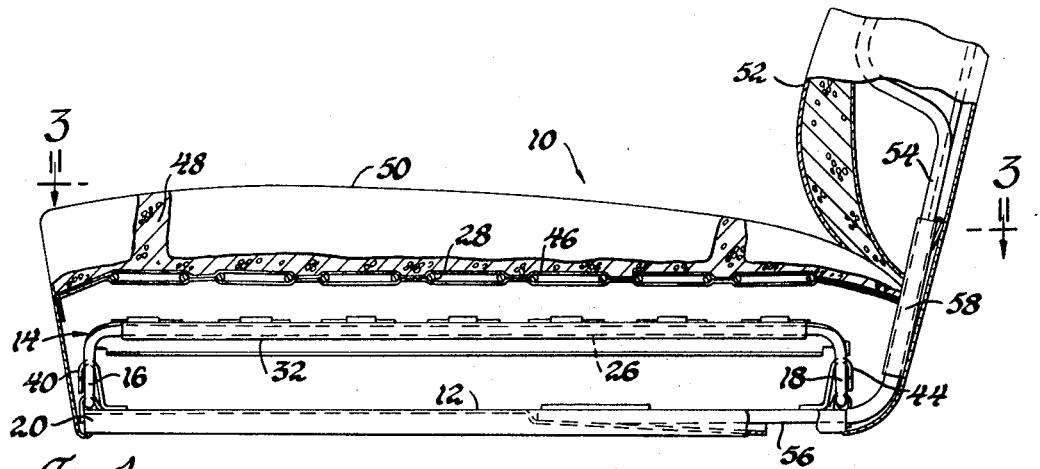
FIG. 1 is a side view, in cross section, of a single occupant seat assembly employing the invention.
Figure 2:
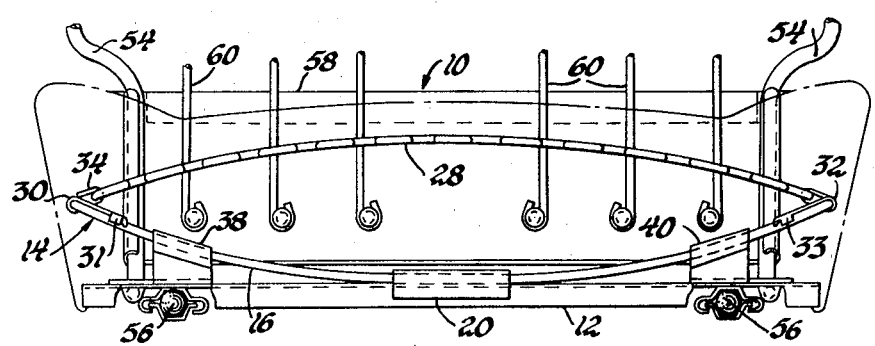
FIG. 2 is a front view, in cross section of the single occupant seat of FIG. 1.
Figure 3:
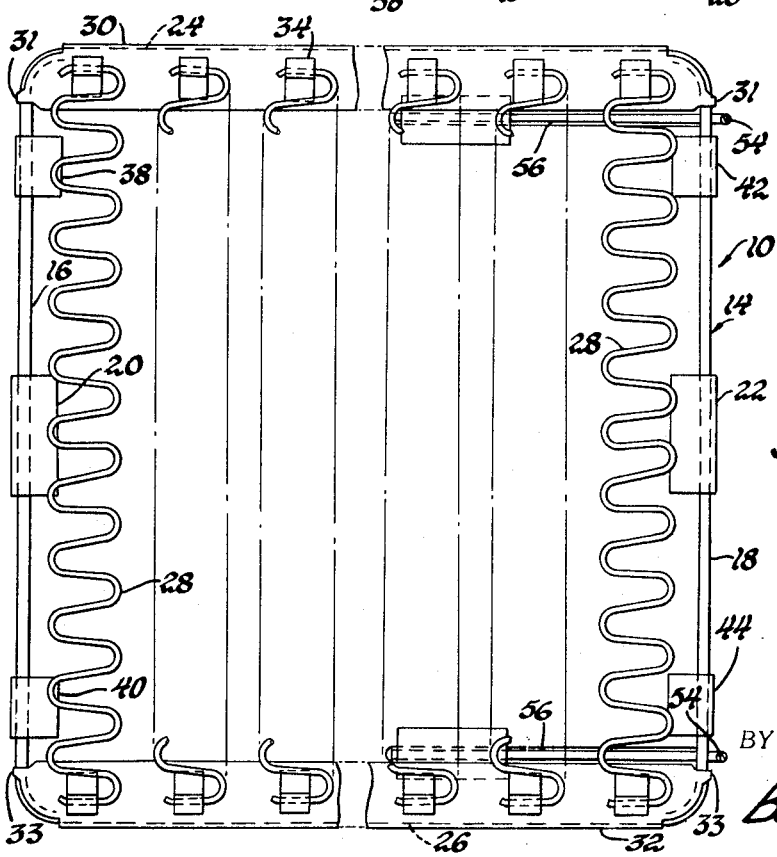
FIG. 3 is a plan view of the seat of FIG. 1.

Referring now to FIGS. 1 through 3 there is shown a single occupant seat assembly 10 representing a first embodiment of the subject invention. Single occupant seat assembly 10 comprises a base 12 of generally rectangular configuration and having an upper surface which lies substantially in a horizontal plane. Base 12 is preferably formed of a suitable material such as steel for connection to the floor of an automobile or as part of a suitable furniture base. Assembly 10 further comprises a resilient border member 14 which is formed of a single length of tempered spring wire stock in such a configuration as to have generally U-shaped end segments 16 and 18 and generally straight and parallel side segments 24 and 26. Border member 14 is oriented within the seat assembly 10 as shown in FIGS. 1 through 3 such that the side segments 24 and 26 extend generally fore-and-aft, i.e., longitudinally, within the assembly and define the lateral borders of the seat.

The bight portions of the end segments 16 and 18 are secured to the horizontal plane surface of base 12 by means of clamps 20 and 22 which are secured, such as by welding, to the steel structural members of the base 12 and bent over the segments 16 and 18. So secured, the laterally symmetrically opposite portions of the end segments 16 and 18 extend outwardly and upwardly in an arcuate pattern away from the upper horizontal support surface of the base 12 thereby to resiliently support the side segments 24 and 26 in such a position as to permit independent arcuate deflection thereof under load.

A plurality of preformed and pre-arched sinuous wire springs 28 are disposed between the side segments 24 and 26 of border member 14 as best shown in FIGS. 2 and 3 to define a seating support area which is generally within the projected periphery of the border member 14. Sinuous wire springs 28 are secured at their opposite ends to the side segments 24 and 26 by means of steel retainer plates 30 and 32. The retainer plates 30 and 32 may be sheet steel stampings having longitudinal rolled-over tubular sections which engage the side segments 24 and 26 of the border member 14 as well as end tabs 31 and 33 which are crimped about the end segments 16 and 18 to prevent a forward or rearward shift of the retainer plates 30 and 32, respectively. Plates 30 and 32 stiffen and reinforce the side segments 24 and 26 and resist any tendency of the side segments to bow inwardly under the tension of springs 28. Retainer plates 30 and 32 are further provided with punched-out and rolled-back tab portions 34 which form channels into which the ends of the sinuous wire springs 28 are readily disposed. The sinuous wire springs 28 are preferably of the type described in the Kaden U.S. Pat. No. Re. 21,263 which, as will be familiar to those skilled in the art, are preformed on a short radius arc so as to require the application of work in order to assume the relatively long radius arc which the springs describe in FIG. 2. So preformed, the sinuous wire springs 28 offer a good seating support quality and have no tendency to assume an unstable condition such as one finds in a Belleville spring when flattened under the application of a load.

Because the sinuous wire springs 28, thus, exert an inwardly directed tension on the side segments 24 and 26, it may be desirable to oppose the tendency of the end segments 16 and 18 to collapse toward the center under this tension. This is accomplished by channel-type deflection limiters 38 and 40 disposed at the front of the assembly 10. Similar channel-type limiters 42 and 44 are disposed at the rear of the assembly 10. Each of these channel-type limiters 38, 40, 42, and 44 has a base portion which is secured to the assembly base 12 and an upstanding channel portion which is disposed about and in engagement with the upper surface of the end segments 16 and 18. Accordingly, the end segments 16 and 18 may not deflect upwardly beyond the limits imposed by the limiters 38, 40, 42, and 44 but may be deflected downwardly toward the base 12 under load as will be described in greater detail hereinafter.

Referring specifically to FIG. 1, the seat assembly 12 may be trimmed up by suitably enclosing the sinuous wire springs 28 in an insulator material such as burlap or plastic mesh and covering the seating support area which is defined by the plurality of parallel springs 28 with a foam cushion 48 of rubber, polyurethane, or the like. The assembly 10 is then covered with a suitable trim fabric 50 to fully conceal and cover the internal assembly components.

As also partially illustrated in FIG. 1, the seat assembly 10 may be provided with a backrest assembly 52 having a pair of laterally spaced spring support wires 54 which may actually be the opposite legs of a U-shaped border wire of the type set forth in the patent to Flint U.S. Pat. No. 3,372,955 issued in the United States on Aug. 16, 1968. As shown in FIGS. 1 and 2, the spring wires 54 extend behind and beneath the seat assembly 10 into contiguous forwardly directed portions 56 thereby to be received in suitable retainer assemblies which form part of the base 12. At the lower rear junction or bend between the forwardly directed portion 56 of the spring wire member 54 and the upwardly directed portion a lateral support member 58 is secured to an extends between the spring wire members 54 and provides an anchor point for additional U-shaped spring wire backrest member 60. Other backrest assemblies may also be employed, such as that of U.S. Pat. No. 3,261,642.

Referring now to the simplified schematic of FIG. 4, the operation of the seat assembly 10 will be described. Because of the schematic nature of FIG. 4, the assembly is identified by the reference character 10'. In assembly 10' the border member 14 comprises the two end segments 16 and 18 which are generally similar and parallel to one another and which resiliently support the laterally spaced and parallel side segments 24 and 26. Simple clamp members 20 and 22 secure the bight portions of the U-shaped end segments 16 and 18 to the upper horizontal surface of the rectangular base 12. Base 12 of course is merely representative of any suitable base to which the border member 14 may be suitably secured. The pre-arched sinuous wire springs 28 are flexed into a long radius arc and secured at their opposite ends between the side segments 24 and 26 so as to define a generally horizontally disposed and convex seating support area. The limiters 38, 40, 42, and 44 prevent the end segments 16 and 18 from being bent into a tighter arch under the tension force of the sinuous wire springs 28.

In operation, an occupant places a load on the seating support surface defined by the sinuous wire springs 28 in the assembly 10'. This imposition of load tends to resiliently deflect the end segments 16 and 18, thus, causing the side segments 24 and 26 to move through an arcuate path of displacement about the center points defined by the clamps 20 and 22. A side segment 26, for example, is displaced through this arcuate path of displacement under load, the portion of the end segment 16 between the clamp 20 and the side segment 26 is deflected into greater lineal engagement with the upper plane surface of base 12; the greater the deflection, the greater the lineal contact between the end segment 16 and the support surface of base 12. This movement of the lineal contact boundary between the end segment 16 and the base 12 outwardly from clamp 20 under load effects a shortening of the lever arm which is defined by the portion of end segment 16 between the lineal contact boundary and the side segment 26. This shortening of the lever arms tends to increase the spring rate of the end segments 16 and 18 and create a load-responsive resilient characteristic.

At the same time, the arcuate displacement of side segments 24 and 26 as described above tends to separate the side segments and stretch the sinuous wire springs 28 which are disposed therebetween. Therefore, as the load is increased on the seating support surface defined by the parallel springs 28, there are two additive load-responsive spring effects which determine the overall load-displacement characteristic of the seat assembly 10'; the first is that caused by the stretching of sinuous wire springs 28 and the second is that caused by the increasing spring rate of end segment 16 and 18 due to increased lineal contact between those end segments and the upper support surface of base 21.

Figures 4, 5, 6:
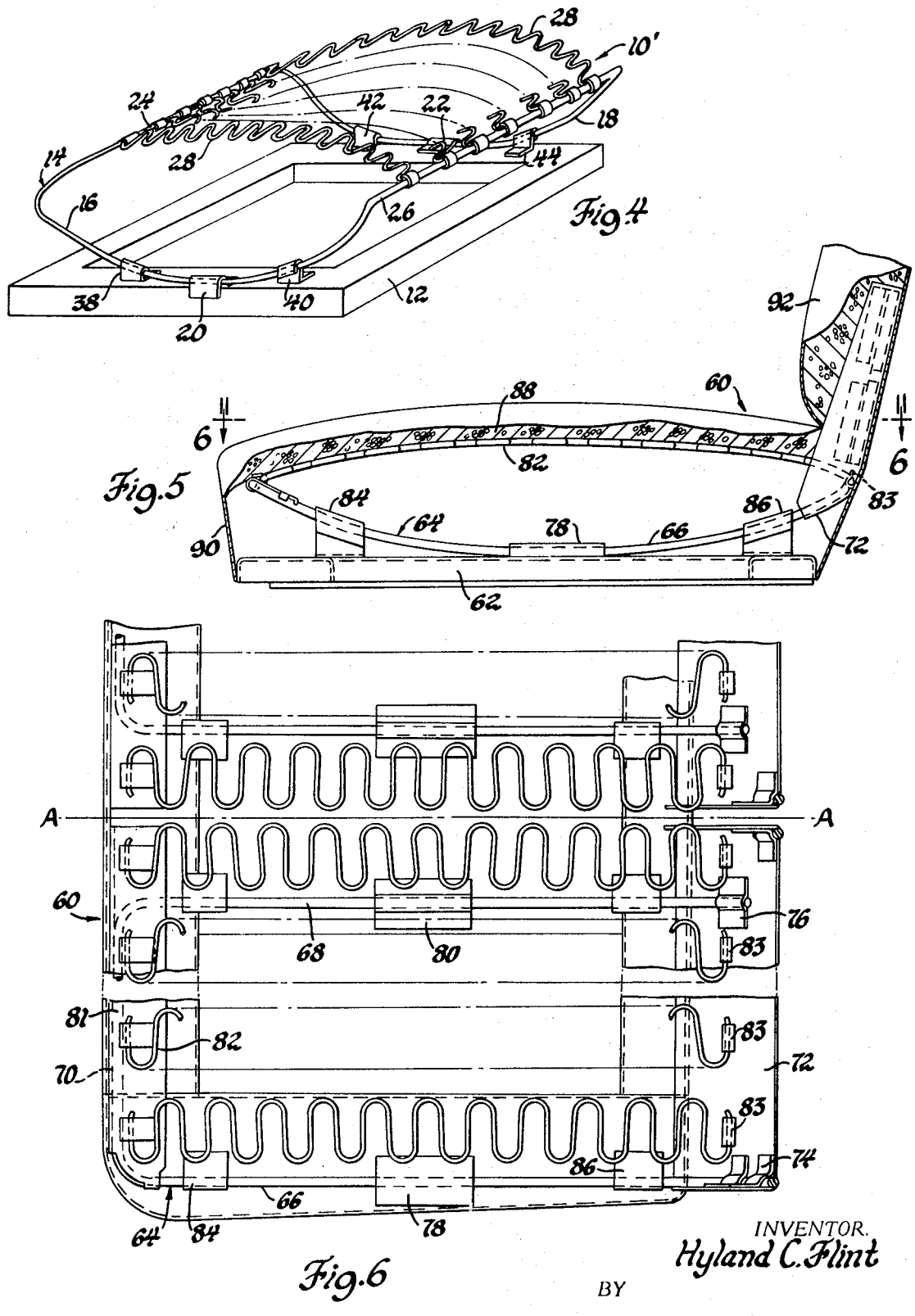
FIG. 4 is a perspective view of a simplified seat assembly generally similar to that of FIG. 1.
FIG. 5 is a side view, in cross section, of a multiple occupant seat employing the invention.
FIG. 6 is a plan view of a representative part of the seat of FIG. 5.

It can be seen by reference to FIG. 4 that the front, rear, and side peripheral surfaces of the seat assembly are all nearly independently resilient and, thus, readily accommodate an uncentered or shifting load situation. Moreover, this provides a full peripheral resilience such that under no circumstances does an occupant encounter a nonresilient seat edge either when properly seated in the assembly 10' or when disposing himself on or leaving the seat assembly 10'.

Referring now to FIGS. 5 and 6, a second embodiment of the invention is illustrated, this embodiment relating to an extended multiple occupant seat generally known in the automotive industry as a bench seat. The second embodiment is shown with respect to a bench seat assembly 60 which may be divided into two reversely symmetrical portions about a centerline A—A as shown in FIG. 6. It will be noted in FIG. 6 that the assembly as shown in broken fashion indicating that the nature and orientation of the internal components to be described readily adapt to an assembly 60 of nearly any desired length.

Referring more specifically to FIGS. 5 and 6, the bench seat assembly 60 is shown to comprise a border structure 64 having U-shaped arcuate end segments 66 and 68 resiliently supporting and joined by side segments 70 and 72. Segment 70 is formed integrally with the spring wire stock of end segments 66 and 68 whereas side segment 72 is a separate plate joined to the upturned ends of segments 66 and 68 by clamps 74 and 76, respectively. The bight portions of the U-shaped end segments 66 and 68 are suitably secured to a base 62 by means of clamps 78 and 80 such that the opposite legs of the end segments 66 and 68 extend upwardly and outwardly therefrom in reversely symmetrical fashion.

It will be noted that a difference between the assembly 60 of FIG. 5 and the assembly 10 of FIGS. 1 through 3 is that the end segments 66 and 68 extend in the fore-and-aft direction in assembly 60 whereas their counterparts 16 and 18 extend in the lateral direction in assembly 10. However, the assemblies 60 and 10 are otherwise generally similar and provide similar support characteristics.

Describing the assembly 60 in greater detail, it can be seen that a retainer member 81 is suitably secured to the side segment 70 of the border member 64 so as to provide a stable anchor point for one end of a plurality of parallel and laterally spaced sinuous wire springs 82. The other ends of the sinuous wire springs 82 are anchored by means of rolled-back, punched-out tabs 83 in the lateral extending side segment 72. The plurality of sinuous wire springs 82, thus, define a generally convex seating support area which may be covered with a foam pad 88 and trim fabric 90 to define a fully upholstered and trimmed seat suitable for use in automotive applications.

The seat assembly 60 may further include a backrest assembly 92 which is generally similar to the backrest assembly 52 shown and described with reference to FIGS. 1 through 3.

In operation, it can be seen that the assembly of FIGS. 5 and 6 affords generally the same load responsive support characteristics as that afforded by the assembly 10 of FIGS. 1 through 3. More specifically, the imposition of a load on the convex seat support area defined by the plurality of sinuous wire springs 82 causes arcuate deflection of the side segments 70 and 72 relative to the base 62. This arcuate deflection moves the longitudinally opposite ends of the arcuate end segments 66 and 68 apart and stretches the plurality of sinuous wire springs 82. Moreover, the deflection of the end segments 66 and 68 creates a linearly outwardly moving contact boundary between the end segments 66 and 68 and the upper support surface of base 62. This has the effect of shortening the effective lever arms defined by the arcuate end segments 66 and 68 which support the side segments 70 and 72. Accordingly, a composite spring effect produces a load-responsive support characteristic thereby to produce increased load resistance with increasing deflection under load. Therefore, it has been found that the seat assembly 60, like the seat assembly 10, provides a load responsive support characteristic wherein persons of significantly different weight may nevertheless produce a very nearly similar total deflection of the actual seat surface.

It is to be understood that various structural modifications in the assemblies 10 and 60 may be made without departing from the present invention. For example, the sinuous wire springs 28 and 82 may be replaced with other forms of resilient spring devices; the border member 14 and 64 may be composite structures formed of separate pieces rather than unitary, as shown, and moreover may be formed of leaf spring stock rather than spring wire stock. In addition, the assembly 10' schematically illustrated in FIG. 4 may be used in various ways within a seat assembly such that the so-called border structure 14 does not necessarily define or correspond with an actual seat border or periphery.

Referring now to FIGS. 7 through 11 a third embodiment of the invention is shown in the form of a single-occupant spring seat assembly 100. Assembly 100 comprises a base 102 in the form of a steel plate having longitudinally extending downturned edges. Assembly 100 further comprises a first border structure 104 disposed on the base 102 and including front and rear spring wire end segments 106 and 108, respectively. Each of the end sections is a reversely symmetrically curved length of round cross-sectioned spring wire stock the bight portion of which is slightly flattened to lie against the base 102. Channel-type clamps 110 and 112 are employed to secure the bight portions of the end segments 106 and 108 to the upper support platform of the base 102 by welding or the like in a generally parallel and longitudinally spaced orientation.

Figure 10:
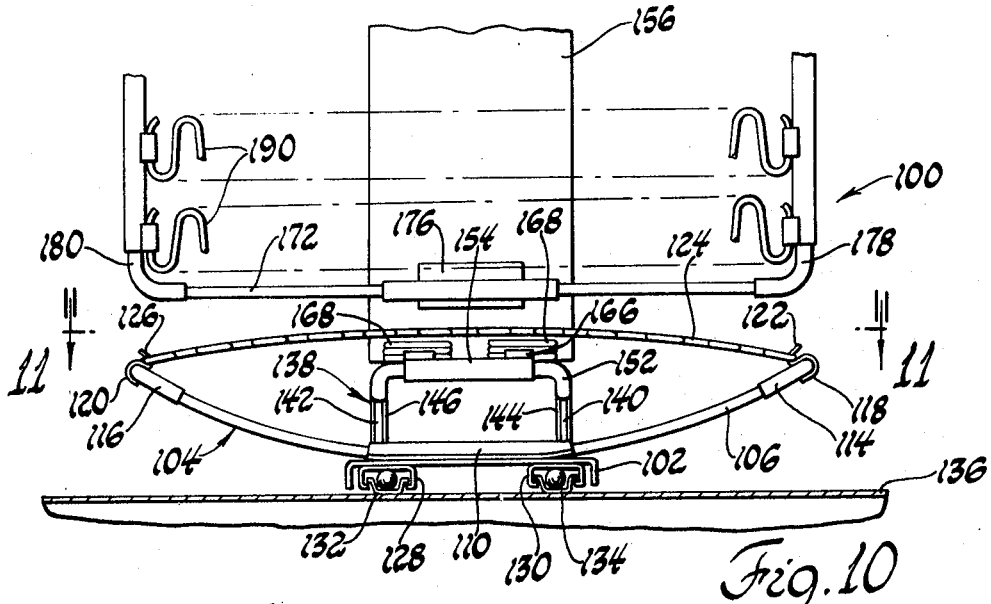
FIG. 10 is a partial front view of the single occupant seat assembly of FIG. 7.

Border structure 104 further includes relatively straight, tubular side segments 114 and 116 having end portions which are bent at right angles to receive therein the outwardly disposed ends of the end segments 106 and 108. The side segments 114 and 116 are thus resiliently supported by the end segments 106 and 108. Disposed on the side segments 114 and 116 are elongated retainer members 118 and 120 having a semicylindrical cross section so as to be easily wrapped about the side segments, as best shown in FIG. 10. The retainer member 118 is provided with a plurality of uniformly longitudinally spaced tabs 122 which are rolled back to afford the securement of one end of a plurality of transversely oriented sinuous wire springs 124. The other end of each of the sinuous wire springs 124 is secured to retainer tab 126 which is formed out of the retainer member 120 on the side segment 116. Again, the sinuous wire springs 124 are prebowed in a tight arc and thus must be uncurled in order to assume the geometric configuration illustrated in FIGS. 7 and 10.

Seat assembly 100 is adapted for longitudinal adjustment by means of a pair of longitudinally extending upper track members 128 and 130 which are disposed under and secured to the base 102 as best shown in FIG. 10. The upper track member 128 and 130 cooperate with internal lower track members 132 and 134, respectively, and a series of unnumbered ball bearings to permit the longitudinal adjustment of the seat assembly 10 relative to a support surface 136 which may be the floor of an automobile. Suitable latching means of a type well known to those of ordinary skill in the art may be employed to selectively lock the seat assembly 100 in any one of several longitudinal orientations.

Figure 11:
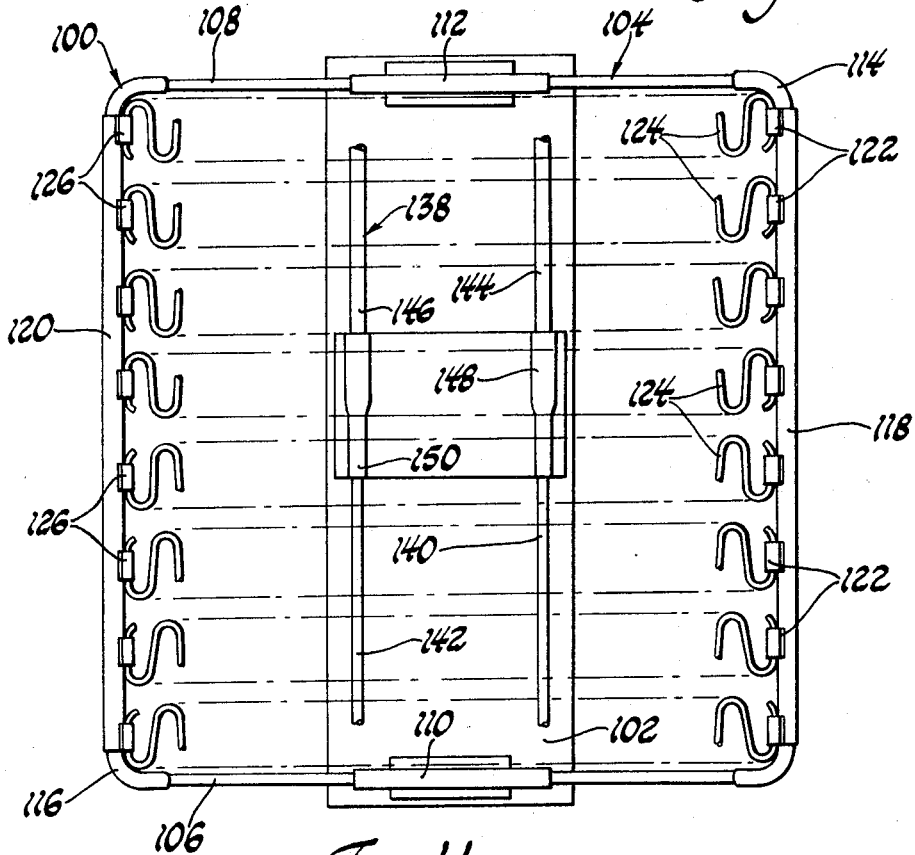
FIG. 11 is a plan view of the seat portion of the assembly of FIG. 10.

Seat assembly 100 further includes a second border structure 138 which is also disposed upon the base 102 and resides substantially within the confines of the first border structure 104. Border structure 138 is a composite rather than unitary structure and comprises a pair of longitudinally oriented, spaced, parallel end segments including forwardly extending portions 140 and 142 rearwardly extending portions 144 and 146 and double entry retainer sockets 148 and 150. The retainer sockets 148 and 150 are secured, such as by welding, to the base 102 and as best shown in FIG. 11, are of larger internal diameter toward the rear than toward the front. Accordingly, the retainer sockets 148 and 150 receive the forwardly disposed end segment portions 140 and 142 which are of a first spring wire size whereas the rear openings of the retainer sockets 148 and 150 receive rearwardly disposed end segment portions 144 and 146 of a larger wire size. This disparity in wire size between the front and rear portions of the end segments of border structure 138 introduces a dissimilarity in spring rate as between the front and rear of the border structure 138 such that the rearward portion of that border structure is capable of bearing a greater load for purposes which will be described below.

Border structure 138 further comprises a side segment 152 which is tubular in nature and bent at right angles adjacent the ends thereof to receive the outer ends of the end segment portions 140 and 142. Clipped over the side segment 152 is a stamped and bent retainer member 154 for purposes to be described. The rearwardly extending arcuate end segment portions 144 and 146 are curved abruptly upwardly toward the rear of the assembly 100 to receive a substantially vertical backrest support member 156. This member is adapted to support a backrest 158 the specific character of which will be described in the following. Backrest support member 156 is a sheet stamping having curled transverse end surfaces 160 and 162 as best shown in FIG. 9 which forms channels to receive the upturned ends of the end segment portions 144 and 146. Also disposed on the lower portion of the backrest support member 156 is a pair of loop-type clips 164 which are adapted to receive one end of each of a pair of sinuous wire spring 168. The other ends of the springs 168 are secured to the reversely turned clip portions 166 on the retainer member 154 which is in turn secured to the side segment 152.

It can be seen particularly with reference to FIGS. 7 and 10 that the sinuous wire springs 168 of the internal border structure 138 underly the springs 124 of the external border structure 104. The internal spring means which is resiliently supported by border structure 138, thus, forms a secondary or helper spring set which is picked up so as to begin to support a load on the seat assembly 100 after the primary seat surface springs 124 and the external border structure 104 have deflected to a certain degree.

Referring now to the backrest 158 in greater detail, it will be seen that the basic structural design of the backrest 158 is identical to the seat portion of the assembly 100, thus, permitting the standardization of parts and assembly procedures. More specifically, backrest 158 comprises upper and lower resilient U-shaped end segments 170 and 172 which are fabricated from spring wire stock and of which segment 170 is somewhat smaller than segment 172. Channel-type securing retainers 174 and 176 are employed to firmly fasten the bight portions of the end segments 170 and 172 to the backrest support member 156. Side segments 178 and 180 of tubular character are secured to and disposed between the ends of the end segments 170 and 172 so as to complete the composite border structure of the backrest 158. It will be noted particularly with reference to FIG. 8 that the backrest 158 is narrower at the top than at the bottom as to provide a pleasing design for an automobile seat or the like.

Disposed over the side segments 178 and 184 are retainer members 182 and 184, respectively, the retainer member 182 having a plurality of uniformly spaced tabs 186 formed therein and the retainer member 184 having a plurality of uniformly spaced tabs 188 formed thereon. Disposed between and secured by the tabs 186 and 188 are a plurality of laterally extending vertically spaced parallel sinuous wire springs 190 which form the load support surface of the backrest 158. Again, the springs 190 are of the prebowed type used in the seat portions of the assembly 100. Although not shown in the drawings, it is to be understood that suitable insulator pads, cushions, and trim material are employed in the seat assembly 100 and are added thereto prior to installation or use.

Discussing the operation of the embodiment of FIGS. 7 through 11 briefly, it will be observed that the first border structure 104 together with the spring 124 operates in a manner which is similar to the operation of the embodiment of FIG. 4 previously disclosed. In brief, the application of a load to the seat support surface defined by the springs 124 causes a downward flexure of the end segments 106 and 108 which in turn causes a lateral stretching of the springs 124. Sufficient flexure of end segments 106 and 108 causes the point of contact between the end segments and the flat support surface of base 102 to move outwardly, thus, increasing the spring rate of the end segments. In addition, sufficient deflection of the border structure 104 causes the springs 124 to come into contact with the springs 168 of the secondary border structure 138. When this occurs, part of the applied load is taken up by the secondary border structure 138 and the springs 168 which are secured thereto.

Border structure 138 together with springs 168 operates in a fashion which is for all practical purposes identical to that of the primary border structure 104 and the springs 124. However, because of the use of larger stock in the fabrication of the rear portions of the composite end segments of the secondary border structure 138, the rear portion of the assembly 100 is capable of assuming a greater load than the forward portion. Stated another way, the forward portion of the assembly is somewhat softer than the rear portion. This is, of course, as it should be since the point of greatest loads on the assembly 100 when normally occupied by a human being is approximately two-thirds of the way towards the rear of the assembly.

Moreover, the assembly 100 includes a backrest 158 which is, of course, mounted on the portions 144 and 146 of the end segments of the border structure 138. Because the backrest support member 156 is mounted directly on the resilient end segment portions 144 and 146 a degree of resilience in the support of the backrest 158 is provided. However, the backrest support member 156 in itself is not resilient to any great degree because of the strengthening effect of the curled edges 160 and 162.

As a person applies a greater load to the backrest 158, the end segments 170 and 172 thereof tend to flex rearwardly, thus, slightly spreading and stretching the springs 190 which are disposed between the side segments 178 and 180. The spring effect of the backrest 158 is, thus, identical to the spring effect of the seat.

It is to be understood that the internal border structure 138 of the assembly 100 is neither necessary nor desirable in all seats. Accordingly, the forward portions 140 and 142 thereof as well as the side segment 152 and the springs 168 may be eliminated in some applications.

Referring now to FIGS. 12 and 13, a still further embodiment of the invention is shown in an assembly 200 which comprises a base 202 and a unitary spring wire border structure 204 having arcuate U-shaped end segments 206 and 208 joined by parallel straight side segments as was the case with the embodiment of FIG. 4. The end segments 206 and 208 of the border structure 204 are secured to the base 202 by means of channel type fasteners 210 and 212 which are secured such as by welding to ramp blocks 214 and 216 which in turn are secured to base 202. The ramp blocks 214 and 216 tend to tilt the assembly 200 slightly upwardly in the front as best shown in FIG. 12.

A retainer member 218 is disposed over the side segment of the border structure 204 which appears at the front periphery as provided with suitable tabs to retain the ends of a plurality of longitudinally oriented, parallel, sinuous wire springs 220 which form the primary seat support surface. The rearward end of the springs 220 is suitably secured to a backrest support pan 222 by means of tabs, not shown. Backrest support pan 222 is adapted to receive and support a backrest assembly 224 this assembly including a unitary spring wire border structure 225 having vertically oriented substantially U-shaped end segments 226 and 228 and parallel upper and lower side segments. End segments 226 and 228 are secured to pan 222 by welded clamps 242. Disposed over the lower side segment is a retainer member 228 which is substantially identical to the retainer member 30 of the embodiment of FIG. 3. A substantially identical retainer member 230 is disposed over the top side segment between the end segment 226 and 228. Stretched between the tabs of the retainer members 228 and 230 is a series of vertically oriented substantially parallel sinuous wire springs 232 which form the backrest load support area.

It will be particularly noted that in the embodiment of FIGS. 12 and 13, the border wire 226 is shaped such that the arcuate portions thereof under the clamps 242 are of a shorter radius of curvature than the portions thereof above the clamps. This shorter radius of curvature which is best illustrated in FIG. 12 gives the lower portion of the backrest 224 a higher spring rate than the upper portion of the backrest and, thus, permits the lower portion to be displaced less under a given load. This quality may be desirable when the assembly is used in an automobile where the occupant of a seat may, by depressing a brake or throttle pedal, apply a significantly greater load against the lower portion of the backrest than he applies against the upper portion of the backrest.

Also employed in the embodiment of FIGS. 12 and 13 is a secondary border structure 234 having U-shaped and laterally oriented end segments 236 and 237 which are integral with longitudinally extending side segments. The side segments are again provided with suitable retainer members for the securement of sinuous wire springs 238. These springs extend laterally across the assembly 200 beneath the longitudinally extending primary support surface springs 220 and again operate as a secondary spring system to add additional support for greater loads and greater deflections.

Referring now to FIGS. 14 through 17, a still further embodiment of the invention is shown in a single-occupant seat assembly 300 having a border structure 302 resiliently disposed on a base 334 and carrying a plurality of parallel sinuous wire springs 324. Spring strips 324 extend in the lateral direction in the assembly 300 but may extend in the longitudinal direction depending upon the particular application of the design which is embodied in the assembly 300.

Border structure 302 comprises resilient end segments and substantially nonresilient side segments as is the general case for the embodiments of the invention described herein. However, the end segments are composite rather than unitary as best illustrated in FIG. 14. The longitudinally foremost end segment comprises a pair of identical, arcuate elements 304 and 306 which are formed of spring steel stock having a substantially circular cross section. Elements 304 and 306 are disposed on the base 334 in reversely symmetrical relation about the centerline of the seat assembly 300 so as to resiliently support stamped steel side segments 310 and 312 which extend longitudinally of the assembly 300. Side segments 310 and 312 are resiliently supported at the rear of the assembly 300 by a second pair of end segment elements collectively identified in FIG. 15 by the reference character 308. Side segment 312, which is typical, includes longitudinally opposite end tabs 314 and 316 which are bent around the spring wire elements 306 and 308, respectively, and a longitudinally extending turned-over edge 318 which extends around the looped ends of the element 306 and 308. As best shown in FIG. 16, side segment 310 also includes longitudinally spaced end tabs, of which tab 317 is turned about the spring wire element 304, and a longitudinally extending turned-over side edge 319 which is turned about the looped end of the element 304.

Side segments 310 and 312 are substantially rigidified by the double-wall channel formation which is provided by the turned-over edges 319 and 318, respectively. Moreover, these turned-over edges 319 and 318 are provided with reversely turned-back tabs 320 and 322, respectively, which receive and secure the ends of the sinuous wire spring strips 324. As was previously the case, the spring wire strips 324 are preformed in a tight arc and then are unwound to the configuration of FIG. 14 and secured in place. Therefore, the spring strips 324 impose at least a moderate upward and inward tension on all of the end segment elements including elements 304 and 306.

The arcuate elements 304 and 306, which again are taken as representative, are secured to the seat base 334 by means of looped-back ends 326 and 328 which receive threaded nut and bolt assemblies 330 and 332, respectively. As best shown in FIG. 17, the looped ends 326 and 328 lie laterally adjacent to one another and substantially flat on the base 334. Laterally spaced holes are drilled in the base 334 and in a retainer plate 336 which is disposed over the flat lying looped ends 326 and 328. The bolt and nut assemblies 330 and 332 are then directed through the holes in the retainer plate 336 and the base 334 as well as through the looped ends 326 and 328 to secure the elements 304 and 306 in place.

The end segment elements represented by 308 in FIG. 15 are similarly secured to the base 334 by means of nut and bolt assemblies 340 and a retainer plate 338. It will be noted that the elements 304, 306, and 308 are all identical and thus require only the fabrication of a single part. The reversal of the elements 306 and 308 which is apparent in FIG. 15 is simply accomplished by making an end-for-end reversal of the element during installation.

The assembly 300 further includes a set of end segment elements 342 which are disposed longitudinally intermediate the end segment element 306 and 308 as best illustrated in FIG. 15. THere are, thus, six arcuate end segment elements in all, three on a side. Intermediate element 342 is again identical to elements 306 and 308 and has an upper looped end 344 which is secured to the side segment 312 by means of a nut, bolt, and washer assembly 346. The lower looped end of the element 342 is secured directly to the base 334 by means of a nut and bolt assembly 348 and a retainer clamp 350. Although not specifically illustrated in FIG. 15 it is to be understood that the intermediate end segment assembly includes two reversely symmetrical elements such as 342 which are oriented in a fashion identical to the orientation of the reversely symmetrical elements 304 and 306 of FIG. 14.

The operation of the assembly 300 shown in FIGS. 14 through 17 is substantially identical to the operation of the assemblies illustrated in FIGS. 1 through 13. The resilient arcuate elements of the end segments resiliently support the unitary side segments 310 and 312 which, in turn, support the sinuous spring wire strips 324. When a load is imposed upon the seat support surface defined by the spring wire strips 324, the end segment elements 304 and 306, for example, tend to deflect downwardly and outwardly thus stretching the spring wire strips 324. Moreover, a downward and outward deflection of element 306, for example, causes the arcuate portion of that element to roll laterally outwardly over the base 334, thus, effectively shortening the length of the portion of element 306 which supports the spring wire strips 324. This effect increases the spring rate of the support for spring wire strips 324 and, thus, provides the load-responsive action previously described.

It is to be understood that the assembly 300 may be employed both in automotive seat as well as in furniture and in both seat and backrest portions of such applications. Moreover, the assembly 300 may be oriented either longitudinally or laterally relative to the orientation of the occupant and may employ a greater number of intermediate end segment assemblies than is illustrated in FIG. 15 if such be desirable in the particular application. Finally, but not necessarily exhaustively, the assembly 300 may be provided with supplemental support systems of a type previously described herein or of other types if such be more desirable. Accordingly, the above descriptions are to be construed only as illustrative and not as limiting the invention.

The embodiments of the invention in which an exclusive property or privilege is claimed are defined as follows:

1. A seat assembly comprising: a base; means defining a border structure having two resilient end segments and two side segments; means securing the end segments substantially at the midpoints thereof to the base; the end segments being reversely bent away from the base about the securing means to resiliently support the side segments relative to the base; and continuous spring means extending between the side segments and defining a convexly curved seat support area which, when loaded, tends to displace said end segments toward said base and said side segments outwardly away from one another.

2. A seat assembly as defined in claim 1 wherein said continuous means comprises a plurality of sinuous wire springs disposed in parallel relation with one another to define a seating support area.

3. A seat assembly as defined in claim 2 wherein each of the sinuous wire springs is of pretensioned and bowed configuration to define a convex seating support area wherein said end segments are flexed upwardly away from said base and said side segments are flexed inwardly toward one another in the unloaded condition.

4. A seat assembly as defined in claim 3 including restraint means on the base for limiting the upward flexure of the end segments relative to the base against the spring force of the sinuous wire springs.

5. A seat assembly as defined in claim 1 wherein the side segments are substantially parallel.

6. A seat assembly as defined in claim 5 wherein the end segments are substantially parallel.

7. A seat assembly as defined in claim 1 wherein the end segments and at least one side segment of the border structure are formed from a single length of spring wire stock.

8. A seat assembly as defined in claim 7 wherein the continuous means includes a plurality of pre-arched sinuous wire springs, and securement means on at least one side segment for receiving and securing the ends of the wire springs.

9. An assembly as defined in claim 8 wherein the securement means is an elongated plate lying along and adjacent to the side segment and having bent over tab portions at the ends thereof to restrain longitudinal displacement thereof relative to the side segment, and a longitudinal portion bent over and around the side segment.

10. An assembly as defined in claim 8 wherein the securement means also serves to stiffen the side segment to resist deformation thereof due to the tension of the wire springs.

11. A seat assembly as defined in claim 1 wherein the end segments are arcuately bent away from the base, the base being constructed to provide a support member underlying each of the end segments such that flexure of the end segments under load extends the contact between the end segments and the support member outwardly away from said securing means thereby to modify the spring rate of the resilient end segments.

12. A seat assembly as defined in claim 1 including a pad overlying the seating support area, and trim means disposed over the pad.

13. An assembly as defined in claim 1 wherein the border structure is oriented such that the side segments extend longitudinally of the assembly.

14. An assembly as defined in claim 1 wherein the border structure is oriented such that the side segments extend laterally of the assembly.

15. An assembly as defined in claim 1 wherein said border structure comprises a plurality of assembled pieces.

16. An assembly as defined in claim 15 wherein said end segments are unitary elements and said side segments are unitary elements.

17. An assembly as defined in claim 16 wherein said side segments are tubular in character and having open ends for receiving the end segments therein.

18. An assembly as defined in claim 1 wherein at least one of the end segments comprises a pair of separate arcuate elements individually secured to said base and extending in opposite directions therefrom.

19. An assembly as defined in claim 18 wherein each of said arcuate elements is fabricated from spring wire, each element having at least one looped end.

20. An assembly as defined in claim 1 wherein the base comprises a metal platform extending longitudinally of the assembly.

21. An assembly as defined in claim 20 including at least one track means operatively connected to the platform for providing longitudinal movement thereof relative to a support surface.

22. An assembly as defined in claim 1 including a backrest secured to the border structure.

23. An assembly as defined in claim 22 wherein the backrest comprises support means integral with the border structure, a second border structure including means defining a pair of second end segments disposed on the support means in spaced relation, means securing the midpoints of the second end segments to the support means, the second end segments being reversely bent away from the support means about the securement means, and a pair of second side segments joining respective ends of the second end segments together.

24. An assembly as defined in claim 23 including a plurality of spring means extending between the second side segments of the backrest.

25. An assembly as defined in claim 24 wherein the spring means are prearched sinuous wire springs.

26. An assembly as defined in claim 23 wherein the support means comprises a substantially vertically oriented member secured to and resiliently supported by the end segments.

27. An assembly as defined in claim 26 wherein the vertical member is substantially rigid.

28. An assembly as defined in claim 23 wherein the second end segments and side segments are separate pieces.

29. An assembly as defined in claim 28 wherein the side segments are tubular and having open ends for receiving the ends of the end segments.

30. An assembly as defined in claim 22 wherein the second end segments are asymmetric about the securing means.

31. An assembly as defined in claim 30 wherein the second end segments are vertically oriented, the radius of curvature of the vertically uppermost portions of the second segments being greater than that of the vertically lowermost portions.

32. An assembly as defined in claim 22 wherein the second end segments are substantially horizontally oriented.

33. An assembly as defined in claim 18 wherein the separate elements of an end segment are of dissimilar spring rate.

34. An assembly as defined in claim 33 wherein the end segments are longitudinally oriented, the rearmost elements having a higher spring rate than the forwardmost elements.

35. An assembly as defined in claim 34 including a backrest assembly disposed on the rearmost elements.

36. An assembly as defined in claim 1 including supplemental spring means on the base and operative to receive at least part of the load carried by the border structure.

37. An assembly as defined in claim 36 wherein the supplemental spring means includes a third border structure disposed on the base and substantially physically within the first-mentioned border structure, the third border structure including a pair of spaced parallel third end segments transverse to the first mentioned end segments and reversely bent about substantially the midpoints thereof, a pair of spaced third side segments extending between and resiliently carried by the third end segments, and a plurality of resilient members disposed between said third side segments.

38. An assembly as defined in claim 32 wherein one of the side segments is a plate member, and a backrest assembly mounted on the plate member.

39. An assembly as defined in claim 38 wherein each of the third end segments comprises two separate and reversely bent elements.

40. An assembly as defined in claim 39 wherein the third end segments are longitudinally oriented, the rearmost elements being of greater spring rate than the forwardmost.

41. A seat assembly comprising: a base; a plurality of parallel spring strips defining a seat support area; at least one U-shaped resilient member secured to the base at the bight portion thereof; said strips being operatively interconnected with the resilient member such that loading of said seat support area causes deflection of the legs of the member toward the base and the stretching of said strips.

42. A seat assembly as defined in claim 41 including a second U-shaped resilient member parallel to the said one member and interconnected with the strips such that deflection of the legs of the second member also effects the stretching of said strips, and a pair of resilient spring wire side segments interconnecting the legs of the two U-shaped members with one another.

43. A seat assembly as defined in claim 42 including a pad disposed over the seat support area, and trim means covering the assembly.

44. In a seat assembly; a base: a border structure comprising first and second pairs of identical arcuate spring elements, the elements of each pair having one end secured to the base and extending reversely symmetrically relative to one another, first and second side segments secured between the other ends of the elements to be resiliently supported and carried by the elements, and a plurality of pretensioned and bowed spring strips extending between the side segments to define a load support area whereby loading of said support area causes flexure of the opposite sides of the spring elements outwardly relative to one another and downwardly toward the base and to straighten said bowed spring strips.

45. The assembly of claim 44 including at least one additional pair of arcuate spring elements identical to the first and second pairs, one end of each element being secured to the base between the said one ends of the first and second pairs, the other ends of the elements of the additional pair being secured to the side segments to support the side segments in concert with the elements of the first and second pairs.

* * * * *